J. D. REILLY.
DEMOUNTABLE RIM.
APPLICATION FILED JAN. 6, 1917.

1,228,246.

Patented May 29, 1917.
2 SHEETS—SHEET 1.

Inventor
James D. Reilly
By *(signature)*
his Attorneys

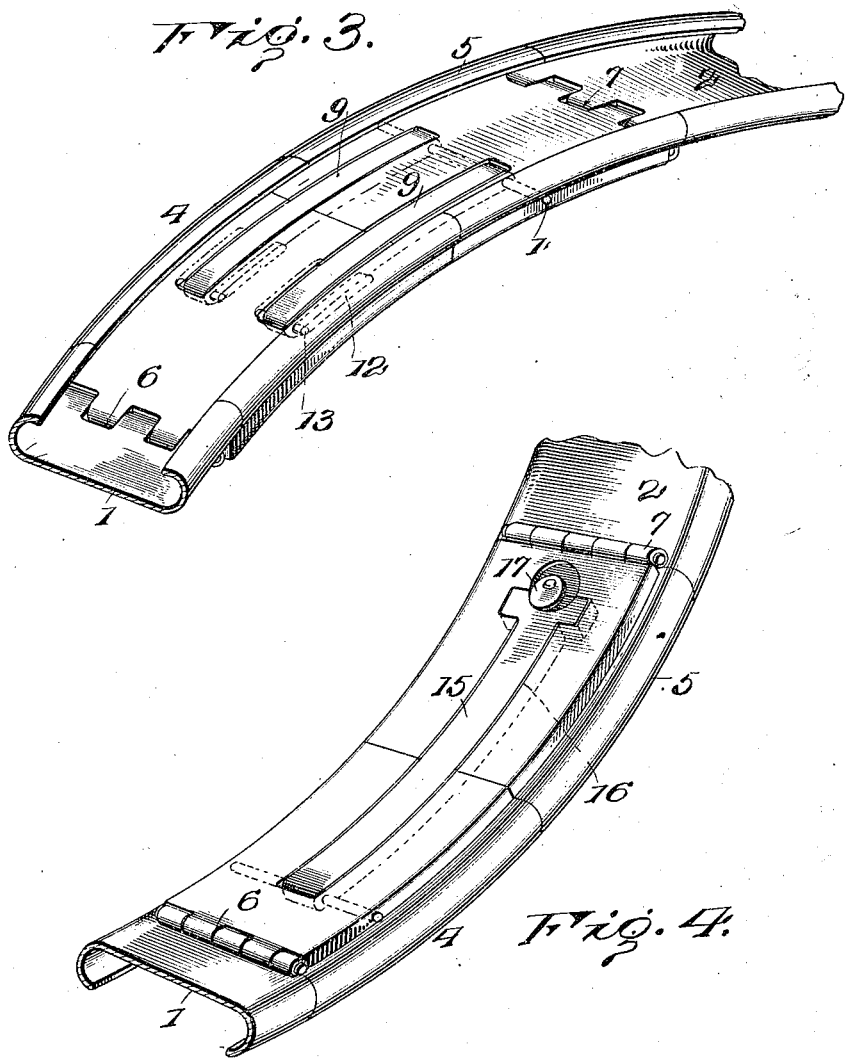

UNITED STATES PATENT OFFICE.

JAMES D. REILLY, OF PROVIDENCE, RHODE ISLAND.

DEMOUNTABLE RIM.

1,228,246.

Specification of Letters Patent.

Patented May 29, 1917.

Application filed January 6, 1917. Serial No. 140,872.

*To all whom it may concern:*

Be it known that I, JAMES D. REILLY, of Providence, in the county of Providence and State of Rhode Island, have invented certain new and useful Improvements in Demountable Rim; and I do hereby declare the following to be a full, clear, and exact description of the invention, such as will enable others skilled in the art to which it appertains to make and use the same.

My invention relates to demountable tire rims for wheels, and particularly to that type of rim comprising hinged sections which may be swung inwardly to decrease the circumferential area of the rim to enable the operator to quickly and easily place or remove a pneumatic tire.

The object of my invention is to provide a rim of this character having improved, simple and efficient means whereby the hinged sections may be fitted each to the other by a squared or butt joint and the several sections maintained in position for alinement and in such alined position, the butt joints of the several parts being effective to prevent collapse of the parts when under pressure of an inflated tire.

Figure 1:
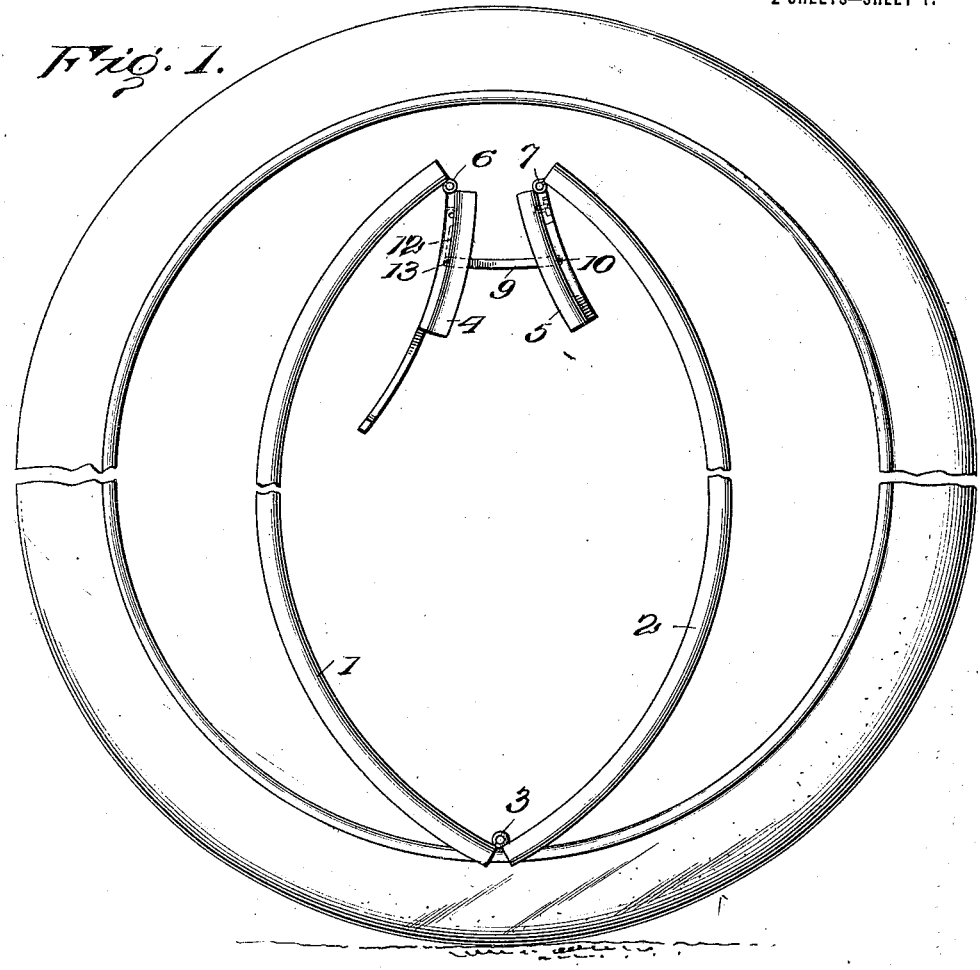
Figure 2:
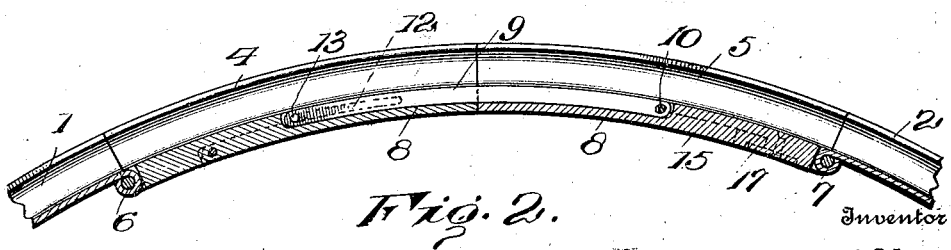

In the accompanying drawings, Figure 1 is a front elevation of a pneumatic tire with my improved rim in knock-down or collapsed position. Fig. 2 is a sectional view through the locking sections. Fig. 3 is a fragmentary perspective of the rim showing the locking sections and connecting links. Fig. 4 is an inverted fragmentary perspective showing a form of latch means.

Referring to the drawings, 1 and 2 designate two sections forming the major portion of the wheel rim, such sections being hinged as at 3. At their opposite ends each of the sections has a locking segment, 4, 5, hinged thereto as at 6, 7. The hinged ends of the sections 1 and 2 and the segments 4 and 5 have what I term squared or butt ends so that the parts will be firmly seated against each other when the rim is expanded. The free ends of the segments 4, 5, are similarly provided with butt ends. By such construction there is no likelihood of the hinged members collapsing under the pressure of an inflated tire as occurs where the members are joined by overlapping portion.

In the drawings I have shown the segments 4, 5, provided on their outer faces with recesses 8, the recesses of the segment 4 alining with those of the segment 5 to form seats for a pair of links 9 which latter have a fixed pivotal connection, as at 10, with the segment 5 and a movable pivotal connection with the segment 4. It is manifest that a single recess in each of the segments, 4, 5, and one link may be employed instead of a plurality of recesses and links as herein shown and described. To effect the movable pivotal connection between the links and the segment 4, I provide the walls of the recesses of the latter with longitudinal grooves 12 which extend about half way of the recesses from the end thereof toward the outer free end of the segment. These grooves form seats for the pivot 13 of the links 9 and allow the latter to move longitudinally of the recesses in breaking the joint between the segments 4, 5. The links are effective to keep the parts in proper position when the rim is expanded as well as to maintain them ready for alining when the rim is collapsed.

To insure against any undue expansion between the rim sections and segments when the rim is in normal position, I provide a T-latch 15 which is adapted to be seated in a recess 16 formed partly in the under face of the segment 4 and partly in a recess in the segment 5, the latter recess being formed to accommodate the T end of the latch. The opposite end of the latter is pivoted to the segment 4. Any preferred means may be employed to hold the latch as against accidental displacement. I have shown a button 17 working in a countersunk recess in the segment 5 which may be turned to engage the latch, a portion of the latter being slightly depressed to permit the button to lie flush with the surface thereof.

The advantages of my invention will be apparent. It will be seen that I have provided a very simple and efficient tire rim which is readily collapsed for placing a tire thereon and which when expanded and held at the side of a vehicle with an extra tire thereon is not likely to collapse under the pressure of the inflated tire.

I claim as my invention:

1. A demountable rim comprising hinged sections, a locking segment hinged to one of said sections and adapted to aline therewith, and a link connecting said segment with the other of said hinged sections, said link being fulcrumed to said segment, and said fulcrum being movable lengthwise of said segment.

2. A demountable rim comprising hinged sections, locking segments each having hinged connection with one of said sections, said sections and said segments having butt ends, a link having a fixed pivotal connection with one of said segments and a movable pivotal connection with the other of said segments.

3. A demountable rim comprising a pair of hinged sections, a pair of locking segments each hinged at one end to its complementary section, a link connecting said segments, said link having a fixed pivotal connection with one of said segments and a pivotal connection with the other segment permitting it to move relatively thereto, said segments having recesses to receive said link.

4. A demountable rim comprising a pair of hinged sections, a pair of locking segments each hinged at one end to its complementary section, and each having a recess, the walls of the recess of one of said segments having a longitudinal groove, a link connecting said segments and adapted to fit in said recesses, and a pivot for said link fitting in said grooves, the opposite end of said link being pivoted to the other of said segments.

5. A demountable rim comprising a pair of hinged sections, a pair of locking segments each having a hinged connection with one of said sections and provided with a recess on its underside, a link connecting said segments, a movable fulcrum for said link, and a latch pivoted to one of said segments and adapted to fit in said recess.

6. A demountable rim comprising a pair of hinged sections, a pair of locking segments each having a hinged connection with one of said sections and provided with a recess on its underside, the recess of one segment being T-shape, said sections and segments having butt ends, a link connecting said segments, a movable fulcrum for said link, and a T-shaped latch adapted to fit in said recess, said latch having a pivotal connection with one of said segments.

In testimony whereof, I have signed this specification.

JAMES D. REILLY.